UNITED STATES PATENT OFFICE.

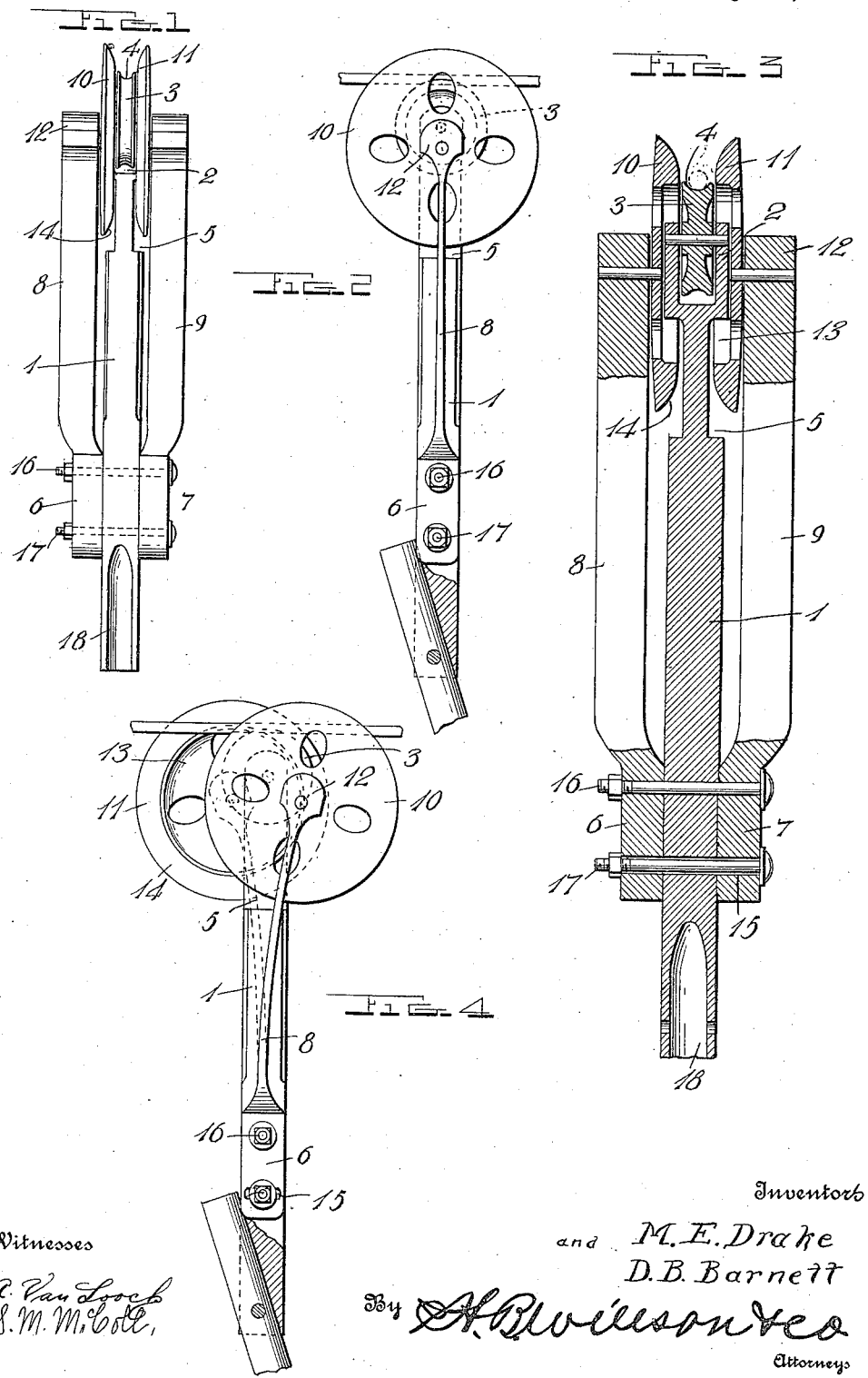

MURRY E. DRAKE AND DANIEL B. BARNETT, OF BESSEMER, ALABAMA.

TROLLEY-WHEEL.

1,059,931.　　　　Specification of Letters Patent.　　Patented Apr. 22, 1913.

Application filed October 17, 1912.　Serial No. 726,329.

*To all whom it may concern:*

Be it known that we, MURRY E. DRAKE and DANIEL B. BARNETT, citizens of the United States, residing at Bessemer, in the county of Jefferson and State of Alabama, have invented certain new and useful Improvements in Trolley-Wheels; and we do declare the following to be a full, clear, and exact description of the invention, such as will enable others skilled in the art to which it appertains to make and use the same.

This invention relates to improvements in trolley wheels.

The object of the invention is to provide a self-adjustable safety trolley wheel for use on fast running electric cars and which is so constructed that it will not wear the trolley wire to any appreciable extent.

Another object is to provide a trolley wheel so constructed that it will run at high speed over rough wires with perfect safety and by the use of which the uniform pressure usually employed on trolley poles to hold the trolley to the wire is dispensed with, the wheel being so constructed that it will follow the wire around acute curves in safety and allow the trolley pole to turn easily at its base.

With these and other objects in view, the invention consists of certain novel features of construction, and the combination and arrangement of parts as will be more fully described and claimed.

In the accompanying drawings: Figure 1 represents a front elevation of the upper portion of a trolley pole with this improved wheel applied; Fig. 2 represents a side elevation thereof; Fig. 3 represents a longitudinal vertical section thereof; Fig. 4 is a side elevation when rounding a curve.

In the embodiment illustrated a trolley pole 1 is shown having a fork 2 at its upper end in which a trolley wheel 3 of ordinary construction is revolubly mounted and provided with a groove 4 in its periphery for contact with the trolley wire W. The neck of the pole 1 is shown cut away or recessed on its opposite faces at 5 for the reception of guard wheels to be described to permit said wheels to fit in close to the flat faces of the trolley wheel 3.

Secured to opposite faces of the pole 1, which faces are preferably flat, are blocks 6 and 7 having spring arms 8 and 9 extending longitudinally therefrom and preferably made integral therewith, said arms being in the form of flat steel plates or strips which are offset from said blocks to space their inner edges a sufficient distance from the pole 1 to permit the free turning between said pole and the inner edges of said arms of guard disks or wheels 10 and 11. These disks 10 and 11 are mounted on the free ends of said arms 8 and 9 with their flat outer faces arranged adjacent the inner edges of said arms and their inner faces adjacent the flat faces of the trolley wheel. These disks are shown mounted on axles fixed in enlargements 12 at the free ends of said arms 8 and 9 and have flat outer faces and concaved or recessed inner faces as shown at 13 to provide for the use of bolts and nuts on the trolley wheel without retarding the turning of said disks. These disks preferably have cut out portions to reduce their weight, and their inner faces adjacent their peripheries are beveled for a suitable width about an inch more or less as shown at 14 to facilitate the entrance of the trolley wire between said disks. The recesses or concavities 13 begin at the base of said beveled portions 14 and when the guard is applied the periphery of the trolley wheel overlaps the outer walls of the recesses or bases of the beveled disk edges to prevent the trolley wire from passing between the disks forming the guard and the wheel.

The spring arms 8 and 9 which support the guard disks are yieldable in a plane parallel with the plane of movement of the trolley wheel to provide for the movement of the disks in said plane when a car is rounding a curve as shown in Fig. 4 thereby rendering less liable any danger of the disengagement of the trolley wheel from the wire. The beveled faces of these disks extend some distance beyond the periphery of the trolley wheel and thus reliably hold said wheel in engagement with the wire, but are yieldable in the direction of the length of the wire.

The blocks 6 and 7 from which the arms 8 and 9 extend are adjustable laterally on the pole 1 by means of slots as 15 which are arranged transversely of said blocks and through which a bolt as 17 passes, said bolt also passing through the trolley pole and being secured in position by a suitable nut. This bolt 17 in connection with a bolt 16 spaced from said bolt 17 secures the blocks to the pole 1. When it is desired to adjust the arms the bolt 17 is loosened and the blocks carrying said arms are swung to the desired position and the bolt is again tightened. If desired this trolley pole 1 may be cut off at a point below the blocks 6 and 7 and one face of said pole scooped out as shown at 18 to fit around the end of an ordinary trolley pole and be secured thereto by bolts, thereby adapting the device for use on poles already in operation.

While we have described our invention with more or less minuteness as regards details and as being embodied in certain precise forms, we do not desire to be limited thereto unduly any more than is pointed out in the claims. On the contrary, we contemplate all proper changes in form, construction and arrangement, the omission of immaterial elements and substitution of equivalents as circumstances may suggest or render expedient.

We claim as our invention:

1. The combination with a trolley pole having a wheel mounted thereon, of spring arms secured to opposite faces of said pole and provided with revolubly mounted disks disposed on opposite sides of the pole adjacent the flat faces of the wheel, said arms being arranged to yield in a plane parallel with the plane of movement of the wheel.

2. The combination with a trolley pole having a wheel mounted thereon, of spring arms secured to opposite faces of said pole and provided with revolubly mounted disks disposed on opposite sides of the pole adjacent the flat faces of the wheel, said arms being arranged to yield in a plane parallel with the plane of movement of the wheel, the inner faces of said disks being beveled near their peripheries.

3. The combination with a trolley pole having a wheel mounted thereon, of spring arms secured to opposite faces of said pole and provided with revolubly mounted disks disposed on opposite sides of the pole adjacent the flat faces of the wheel, said arms being arranged to yield in a plane parallel with the plane of movement of the wheel, the inner faces of said disks being beveled near their peripheries and having recesses disposed opposite the trolley wheel.

4. The combination of a trolley pole having a forked upper end, a trolley wheel mounted in said forked end, said pole having its opposite faces cut out adjacent the base of said forked end, guard disks mounted on opposite sides of said wheels and having flanges extending into the cut out portions of said pole said disks extending outwardly beyond the wheel and being yieldable in a plane parallel with the movement of the wheel.

5. The combination of a trolley pole having a wheel revolubly mounted thereon, spring arms secured to opposite faces of said pole with their inner edges extending toward the pole and spaced therefrom, and guard disks revolubly mounted on said arms in position adjacent to the flat faces of said trolley wheel.

6. A trolley pole, a trolley wheel mounted on the outer end thereof, blocks secured to opposite faces of said pole and having spring arms extending longitudinally from one end thereof, said arms being yieldable in a plane parallel with the plane of movement of said wheel, and guard disks secured to the free ends of said arms on their inner faces.

In testimony whereof we have hereunto set our hands in presence of two subscribing witnesses.

MURRY E. DRAKE.
DANIEL B. BARNETT.

Witnesses:
W. N. DOYLE,
C. ROSS.

Copies of this patent may be obtained for five cents each, by addressing the "Commissioner of Patents, Washington, D. C."